United States Patent [19]

Mužila

[11] Patent Number: 4,594,844
[45] Date of Patent: Jun. 17, 1986

[54] STOP SPINDLE FOR TEXTILE MACHINES

[75] Inventor: Cyril Mužila, Nitra-Chrenová, Czechoslovakia

[73] Assignee: Elitex, koncern textilniho strojirenstvi, Liberec, Czechoslovakia

[21] Appl. No.: 727,536

[22] Filed: Apr. 26, 1985

Related U.S. Application Data

[63] Continuation-in-part of Ser. No. 554,253, Nov. 22, 1983, abandoned.

[30] Foreign Application Priority Data

Nov. 24, 1982 [CS] Czechoslovakia ............... 8396-82

[51] Int. Cl.[4] .................................................. D01H 7/22
[52] U.S. Cl. .......................................... 57/88; 57/100; 57/129; 57/135
[58] Field of Search ................ 57/88, 89, 100, 104, 57/105, 129–135

[56] References Cited
U.S. PATENT DOCUMENTS 2,803,106  8/1957  Lindemann et al. ............... 57/88
2,972,219  2/1961  Collins ............................. 57/88
3,364,670  1/1968  Stiepel et al. .................... 57/88
3,548,582  12/1970  Staufert ............................ 57/88
3,579,973  5/1971  Fetzer et al. ..................... 57/88
3,640,062  2/1972  Anderson et al. ................ 57/88
3,645,083  2/1972  Lohring et al. .................. 57/88

Primary Examiner—John Petrakes

[57] ABSTRACT

A stop spindle for textile machines, particularly spinning and twisting machines. A ferromagnetic clutch element, formed e.g. by a circular disc, is mounted axially displaceably between the whirl of the stop spindle and a brake lining behind which there is mounted an electromagnet. The brake lining is made of non-magnetic material and is mounted between the pole shoes of a permanent magnet. The electromagnet is energized by an electric pulse so as to create a magnetic field which is additive with respect to the magnetic field of the permanent magnet, whereby to start the driving of the spindle; the electromagnet is energized by an electric pulse so as to create a magnetic field which is substractive with respect to the magnetic field of the permanent magnet whereby to stop the driving of the spindle and to brake it.

4 Claims, 10 Drawing Figures

STOP SPINDLE FOR TEXTILE MACHINES

This application is a continuation-in-part of application Ser. No. 554,253, filed Nov. 22, 1983 and now abandoned.

The present invention relates to a stop spindle for textile machines, particularly spinning and twisting machines, said spindle comprising a ferromagnetic disc which is displaceable between the whirl and the brake lining, behind which an electromagnet coacting with said disc is mounted.

In textile machines hitherto known, various spindle constructions are used for imparting twist to textile yarns and for simultaneously winding the twisted yarn onto the chosen type of bobbin. Stop spindles make it possible to stop the spindle during operation of the textile machines, and are of either mechanical or electrical construction.

With mechanical stop spindles, the spindle is stopped, e.g. by a complicated reversing mechanism, which is arranged apart from the actual spindle. The reversing mechanism is placed in its initial state by a force exerted by reverse springs. The spindle is started by exerting force upon a lever mechanism which is arrested upon its being tensioned by its engagement with a pawl. When necessary, the spindle is stopped by disengagement of the pawl, either mechanically or electromechanically, e.g. by means of an electromagnet, whereby the spindle is braked by the action of the reverse springs.

With electrical stop spindles, the spindle is controlled by an electromagnet which is a component of the stop spindle. The electromagnet acts upon the brake-clutch system which controls the spindle. When the electromagnet of the spindle is deenergized, the spindle is entrained by the driving shaft or whirl and rotates. By applying energizing voltage to the electromagnet coil, the brake-clutch system is displaced by the action of the magnetic flux, whereupon the spindle is disengaged from the driving whirl and is braked by the action of the electromagnet acting through engaging frictional braking surfaces.

The basic construction principals of the stop spindles hitherto known mainly display the following disadvantages. The mechanical stop spindles require a large built-up area. Therefore, the moving mechanisms are situated close to each other; this is disadvantageous from the viewpoint of servicing and maintenance, due to difficult access to the separate components of the stop spindle as a result of their being closely spaced. A large number of interlinked elements puts high requirements on their manufacture, and the adjustment of the machine during assembly. The reversing mechanisms have a high failure rate, which is particularly caused by the vibration of the machine.

In electrical stop spindles, the electromagnet coil requires a large number of turns, said coil being usually energized for the whole time of braking the spindle and thus being heated up by the current passing therethrough. For the purpose of reducing the heating up of the coil, as well as its power consumption, it is desirable to provide auxiliary circuits for the spindle control, which temporarily reduce the current flow rate through the electromagnet coil, and thus reduce the total power consumption.

These disadvantages constitute an economic factor in the price of the machine, particularly in view of the fact that there are many stop spindles in a textile machine.

The above-mentioned disadvantages are mitigated or totally obviated by the stop spindle according to the present invention. In such spindle, the brake lining, made of non-magnetic material, is mounted between the pole shoes of a permanent magnet.

A ferromagnetic clutch element, formed e.g. but a circular disc, is mounted axially displacably between the whirl of the stop spindle and a brake lining behind which there is mounted an electromagnet. The brake lining is made of non-magnetic material and is mounted between the pole shoes of a permanent magnetic. A positive voltage pulse of predetermined width is applied to the electromagnet to start of the rotation of the stem of the spindle. The spindle accelerates during the starting time until reaching the same speed of rotation as the whirl. During the normal operation of the spindle, the stem of the spindle rotates synchronously with the whirl. Upon the supplying to the electromagnet of the spindle a voltage pulse of opposite (negative) polarity, the rotation of the whirl of the spindle is slowed down by the braking of the spindle as the magnetic field of the electromagnet cancels the magnetic field of the permanent magnet and moves the circular disc into engagement with the brake lining.

The advantage of the stop spindle according to the present invention consists in the economy gained during its manufacture, as well as during the manufacture of the components involved in the operation of the stop spindle. A further advantage consists in the low power consumption of the stop spindle of the invention. Such stop needs only a small amount of electrical power for the braking function, and per se no electrical power during normal operation of the spindle. The construction of the spindle is simple, and the spindle comprises a minimum number of movable components. The stop spindle according to the present invention is very reliable and makes possible a computer operation of the textile machine.

The further advantages and features of the stop spindle according to the present invention are set forth at length in the following specification disclosing preferred exemplary embodiments thereof and shown in the accompanying drawings.

In the drawings:

FIG. 7b is a view similar to FIG. 1, but with the addition thereto of the second embodiment of pulse applying circuit of FIG. 7a.

Figure 1:
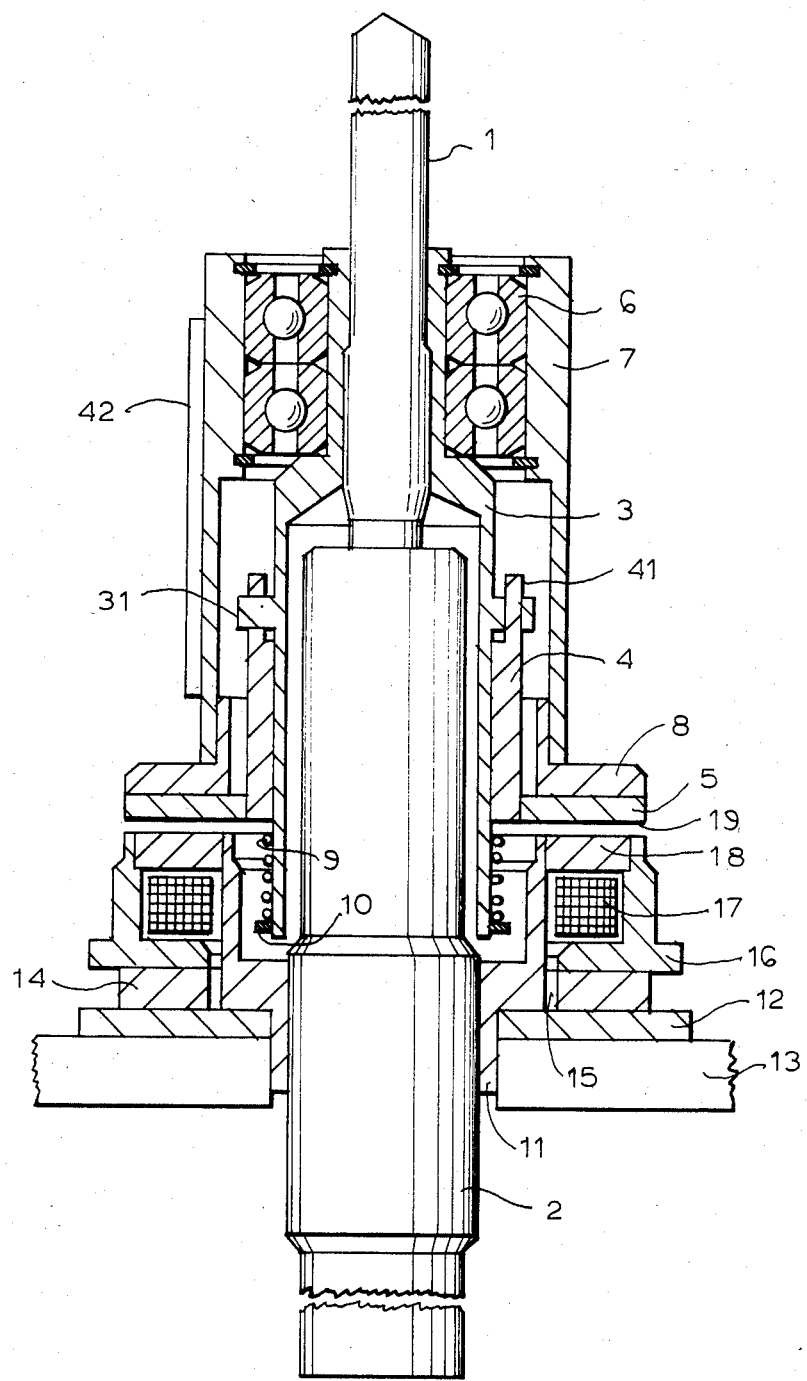
FIG. 1 is a view partially in elevation and partially in vertical axial section through a first embodiment of spindle in accordance with the invention, the spindle being shown in its operative, unbraked condition.
Figure 2:
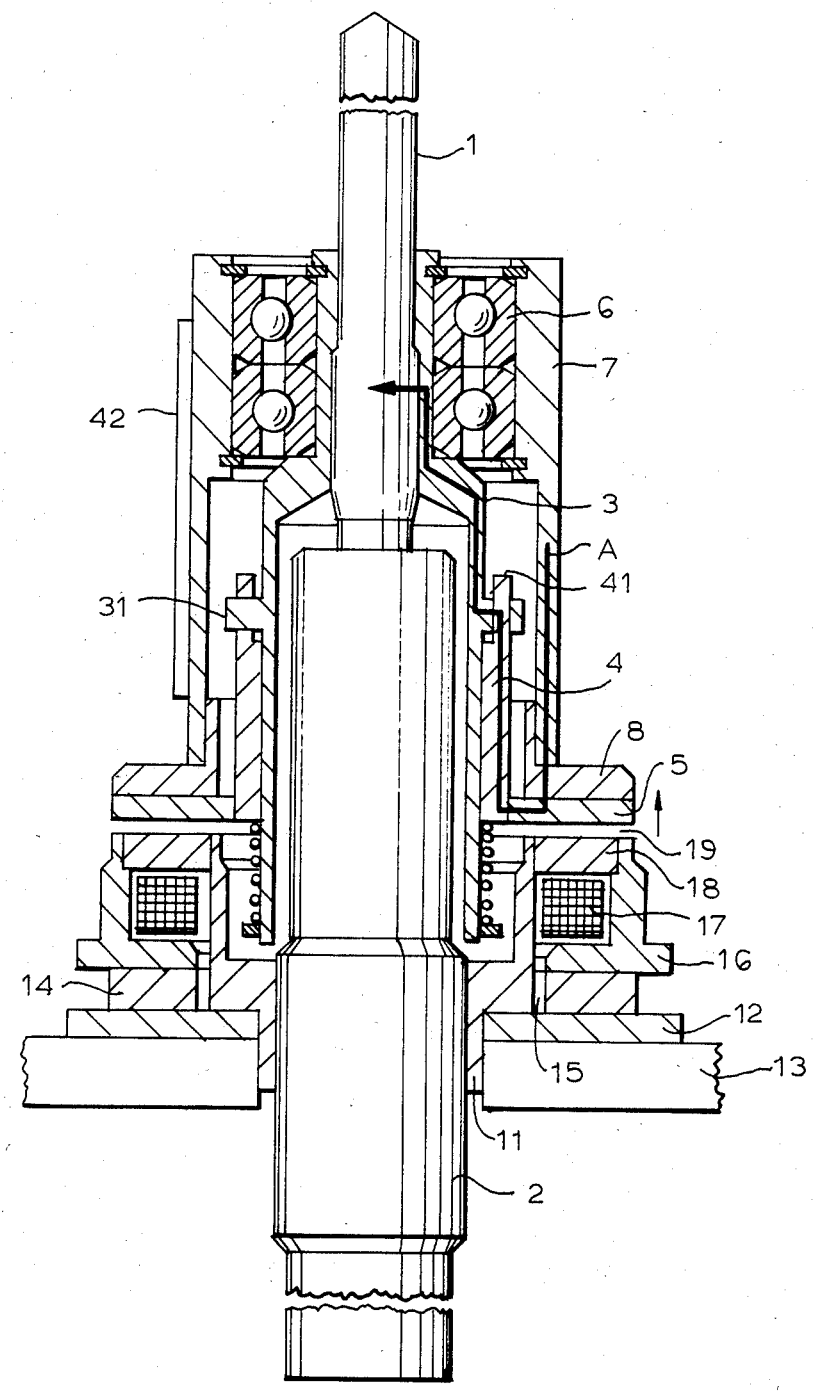
FIG. 2 is a very similar to FIG. 1, but diagrammatically showing the path of driving of the stem of the spindle when the spindle is in its operative, spinning condition.
Figure 3:
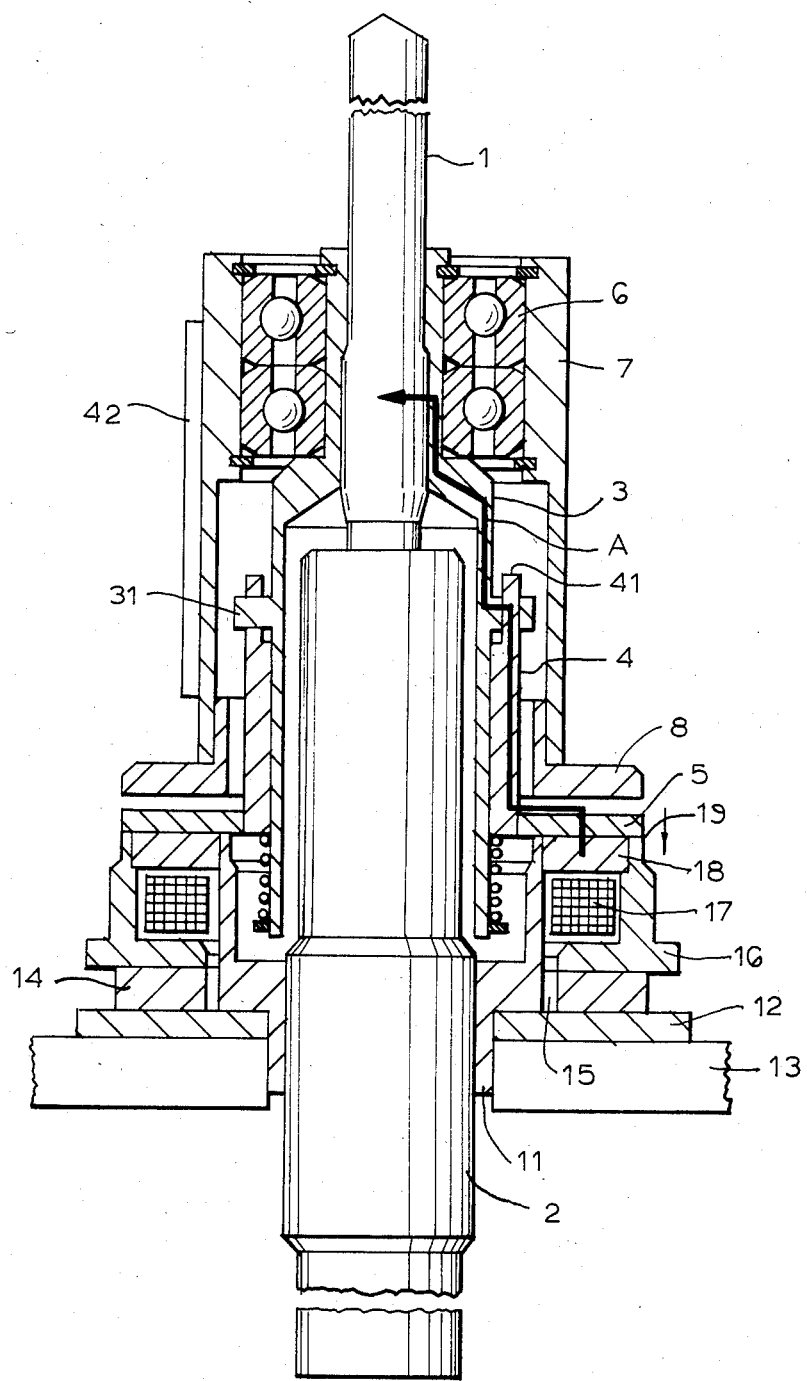
FIG. 3 is a view similar to FIG. 2, but diagrammatically showing the braking moment transfer at the braked spindle.

Turning first to the embodiment of FIGS. 1, 2, and 3, the stem 1 of the spindle is rotatably mounted in the resilient mounting of an insertion 2. A driver 3 is affixed to the stem 1. Radial projections 31 are formed about the circumference of driver 3, axial projections 41 of a bushing 4 being directed between projections 31, the bushing 4 being mounted axially displacably on driver 3. A circular ferromagnetic disc 5, which acts as a clutch element, is connected to the lower end of bushing 4, either fixedly connected to bushing 4, as shown, or resiliently. A whirl 7, having a flange 8 fixedly connected to it at its lower end, is rotatably mounted on the driver 3 by means of bearings 6.

On the lower part of driver 3 there is mounted a coil compression spring 9, one end of which is against a retaining ring 10 which is fixed to the lower end of the driver 3, while the other end of the spring bears against the lower or front end of the bushing 4. Spring 9 constantly urges the circular disc 5 toward the flange 8 of the whirl 7.

The insertion 2 is mounted displacably, with the possibility of being fixed in a selected position, in connection with a ferromagnetic ring 11, which is fixed to a ferromagnetic base plate 12, through the intermediary of which the whole system of the stop spindle is adjusted, or possibly fixed to the spindle carrier 13 of a textile machine (not shown).

At least one permanent magnet 14 is fixed on the base plate 12, magnet 14 being e.g. of annular shape, while between its inner shell and the outer surface of the ferromagnetic ring 11, there is formed an air gap, or another non-magnetic gap 15. The ferromagnetic base plate 12, and the ferromagnetic ring 11 fixed thereto form one pole shoe of a permanent magnet 14.

A second pole shoe is formed by a ferromagnetic annular bushing 16, which is fixedly mounted on the upper front of permanent magnet 14. In the annular magnet 16 there is mounted an electromagnet 17 having a coil with a core. In the upper part, between the ferromagnetic annular bushing 16 and the ferromagnetic conductive ring 11, there is disposed a non-magnetic brake lining 18. Between the ferromagnetic ring 11 and the ferromagnetic annular bushing 16 there is formed a non-magnetic gap, e.g. an air gap 15.

The air gap 15 between the outer surface of the ferromagnetic ring 11 and the inner shell of the ferromagnetic annular bushing 16 and permanent magnet 14 is smaller than the air gap 19 between the free ends of the ferromagnetic ring 11 and the ferromagnetic annular bushing 16 and the braking surface of the circular disc 15 in the unbraked condition (FIGS. 1 and 2) of the spindle.

In the braked condition of the spindle, shown in FIG. 3, the gap between the free ends of ferromagnetic ring 11 and the ferromagnetic annular bushing 16 and the braking surface of ring disc 5 is smaller than the air gap 15 between the outer surface of the ferromagnetic ring 11 and the inner shell of the ferromagnetic annular bushing 16 and the permanent magnet 14.

In the condition of the spindle shown in FIGS. 1 and 2 whirl 7 is driven from a continuous belt 42. In such condition of the spindle, the rotating whirl 7 entrains the circular ferromagnetic disc 5, which is pressed thereagainst by the coil compression spring 9. Bushing 4 is rotated simultaneously with circular disc 5, the bushing 4 in turn rotating the driver 3 of the spindle stem 1. The magnetic circuit of the annular permanent magnet 14 is closed, and the condition of the spindle shown in FIGS. 1 and 2 from one pole of permanent magnet 14 by the ferromagnetic base plate 12, the ferromagnetic conductive ring 11, air gap 15, the ferromagnetic annular bushing 16 to the second pole of permanent magnet 14. The magnetic flux of permanent magnet 14 is also closed via air gap 19 and ferromagnetic circular disc 5. In view of the relation of the width of air gap 15 between the inner circumference of annular bushing 16 of the annular permanent magnet 14 and the outer circumference of the ferromagnetic ring 11 to the air gap 19 between the free ends of the ferromagnetic ring 11 and the ferromagnetic annular bushing 16 and the braking surface of ferromagnetic ring disc 5 in the unbraked condition of the spindle, the power effect of permanent magnet 14 on the circular disc 5 is low, and is overcome by the force of coil compression spring 9. The circular disc 5 is pressed against flange 8 and acts as a clutch for transferring the torque between whirl 7 and the stem 1 of the spindle.

FIG. 2 shows the manner of torque transfer in the unbraked condition of the spindle. In such figure the transfer direction of such torque is shown by a heavy black line A. As can be seem in FIG. 2, driving torque for the spindle stem 1 proceeds from the whirl 7, which is driven by the belt 42, advance downwardly to the flange 8 of the whirl, to the ferromagnetic disc 5, advance upwardly through the bushing 4, to the axial projections 41 thereof which innerdigitate with the radial projections 31.

The condition of the spindle in its braking mode is shown in FIG. 3. By supplying an electric pulse of direct current of a certain (positive) polarity by means of supplying conductors (not shown) to the coil of electromagnet 17, the magnetic flux of both the electromagnet 17 and the permanent magnet 14 are added. The force effect in the air gap 19 between the free ends of the ferromagnetic ring 11 and the ferromagnetic bushing 16, as well as the braking surface of the circular disc 5 is increased, the magnetic force acting upon the circular disc 5 overcoming the force of spring 9, whereby the bushing 4 is actually displaced downwardly in FIGS. 1 and 2 and compresses the spring 9 so that the parts are then put in the condition of FIG. 3. The circular disc 5 then bears against the surface of the brake lining 18, whereupon the stem 1 of the spindle is braked. Simultaneously, the circular disc 5 is removed from the flange 8 of whirl 7, thus disengaging the clutch system and making possible the free rotation of whirl 7.

Stem 1 of the spindle remains in the braked condition after disappearance of the electric switching pulse, since the air gap 19 between the free ends of the ferromagnetic ring 11 and the ferromagnetic annular bushing 16 and the braking surface of the circular disc 5 become smaller and the relation of the air gaps 15 and 19 have been changed in such manner that the gap 19 is now smaller than gap 15. The force effect of the magnetic flux of permanent magnet 14 is now maintained by circular disc 5, which is pressed against the braking lining 18. The transfer of the braking moment at the braked spindle is shown in FIG. 3, in which the direction of braking moment is shown in a heavy black line B. It can be seen that although the whirl 7 continues to be driven by the belt 42, the members 8 and 5 are now spaced apart and the member 18, which is rigidly connected to the stem 1 of the spindle, is now in braking contact with the brake lining 18.

The unbraking of stem 1 of the spindle is accomplished by supplying an electric direct current pulse into the coil of electromagnet 17, said pulse having the opposite (negative) polarity from the pulse which initiated the braking of the stem 1 of the spindle. The magnetic flux of the coil of electromagnet 17 suppresses the effect of the magnetic flux of permanent magnet 14, and spring 9 presses bushing 4 axially away, the circular disc 5 thus being from the brake lining 18; air gap 19 is reformed, which prevents a repeated attraction of circular disc 5 toward the brake lining 18 by the force of permanent magnet 14. The circular disc 5 is pressed by the force of spring 9 against flange 8 of whirl 7, thus activating the clutch system through which the stem 1 is driven. It is to be understood that a bobbin (not shown) is mounted upon stem 1.

Figure 4A:
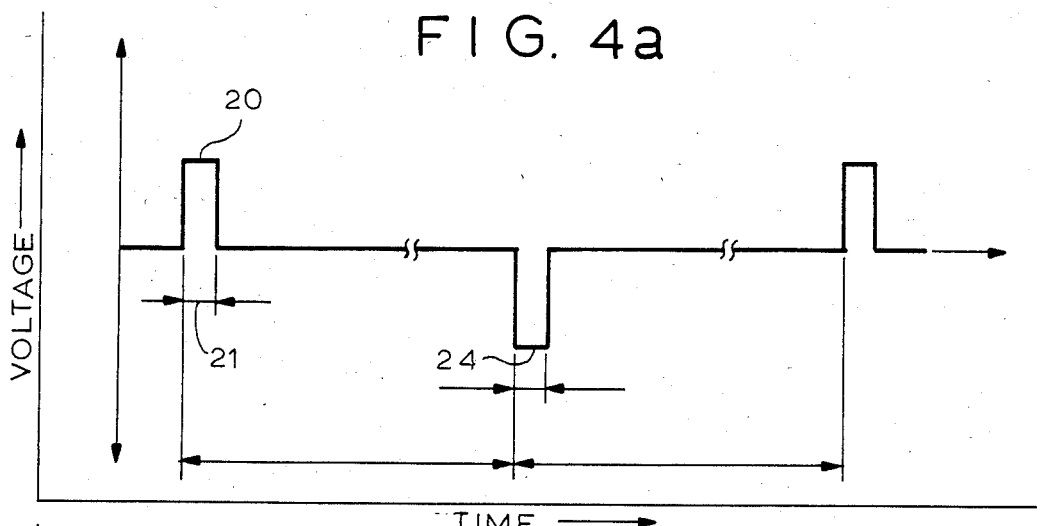
FIG. 4a is a diagram showing the course of controlled pulses for the spindle in a graph having time-voltage coordinates.
Figure 4B:
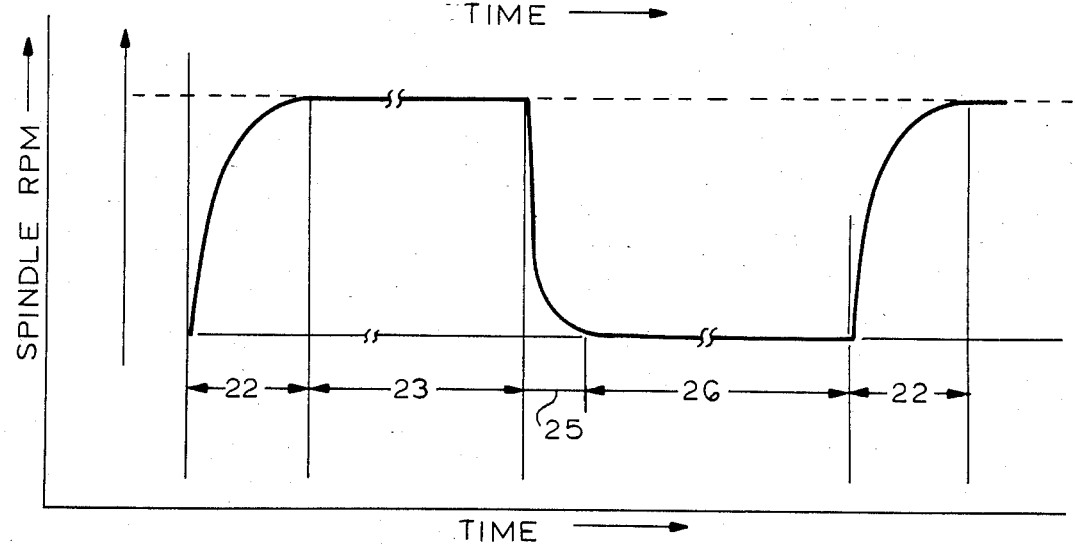
FIG. 4b is a graph having time-spindle rmp coordinates, the values of time on the time coordinates of FIGS. 4a and 4b being the same.

In FIG. 4a the course of control pulses is graphically represented in time-voltage coordinates, and in FIG. 4b the transition conditions of the controlled stop spindle are shown in a graph in which the speed of rotation of the stem 1 is plotted against time. The time coordinates in FIG. 4a and 4b are identical and are aligned.

As shown in FIG. 4b, the positive voltage pulse 20 of predetermined width 21 (FIG. 4a) starts the rotation of stem 1 of the spindle. The spindle accelerates during the starting time 22, until reaching the same speed of rotation as whirl 7. During time 23, the stem 1 of the spindle rotates synchronously with whirl 7. Upon the supplying to the spindle of a voltage pulse 24 of opposite (negative) polarity, the rotation of whirl 7 is slowed down by the braking of the spindle in the manner above described. The braking time 25 is that time during which the speed of rotation of the stem 1 of the spindle is reduced to zero. Within the interval 26 (FIG. 4b) stem 1 of the spindle is at its rest position and is permanently braked until the next command impulse 20', which starts the operation of the spindle.

The intervals of braking the spindle and starting the spindle can be changed to the extent necessary by the selection of the frictional material to be used for the frictional surfaces of the spindle, and by changing the constant of the coil compression spring 9.

Figure 5:
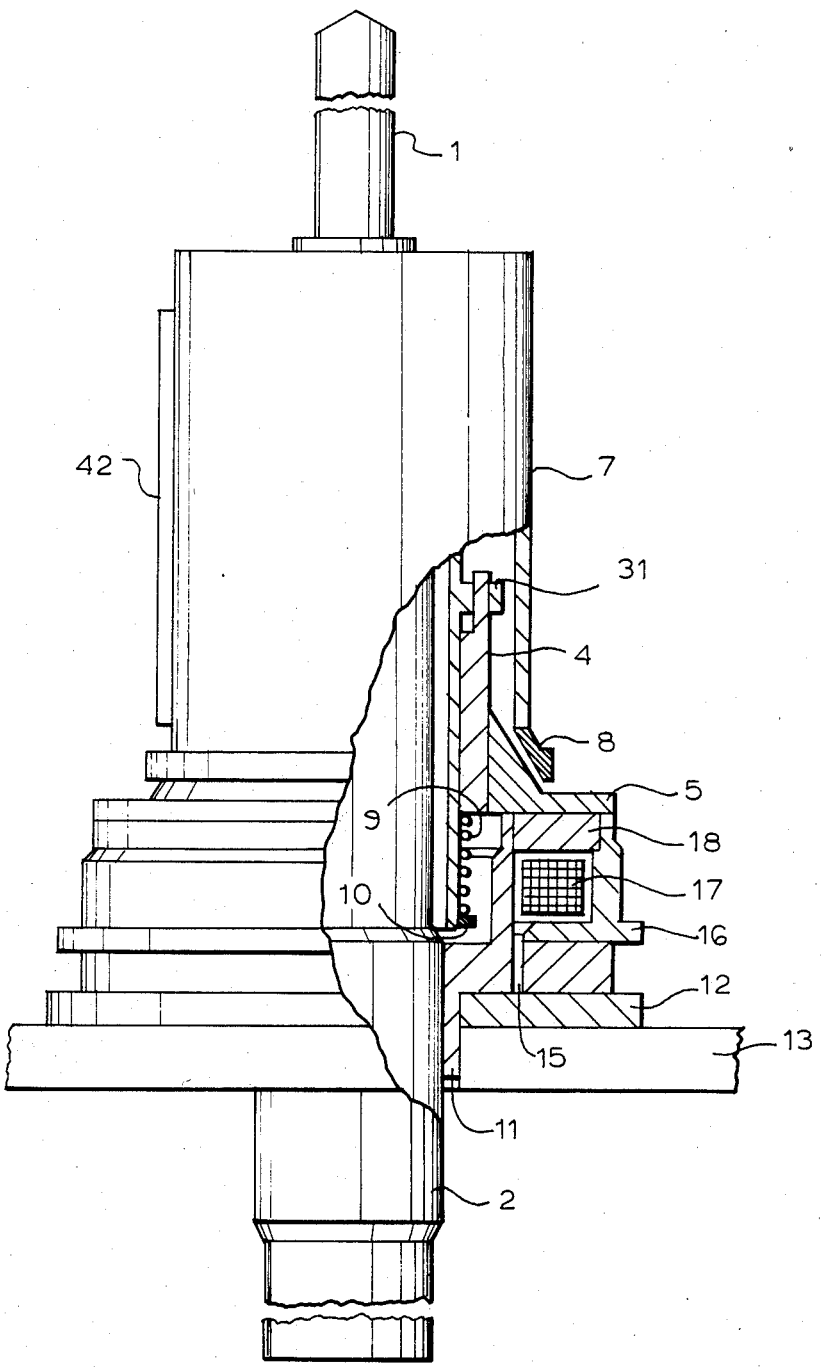
FIG. 5 is a view partially in elevation and partially in vertical axial section through a second embodiment of spindle in accordance with the invention.

In the second illustrative embodiment of the spindle of the invention, shown in FIG. 5, the flange 8' of whirl 7' is provided with an inner conical surface, while on the circular disc 5', an outer conical surface with an equal vertex angle is formed.

Figure 6A:
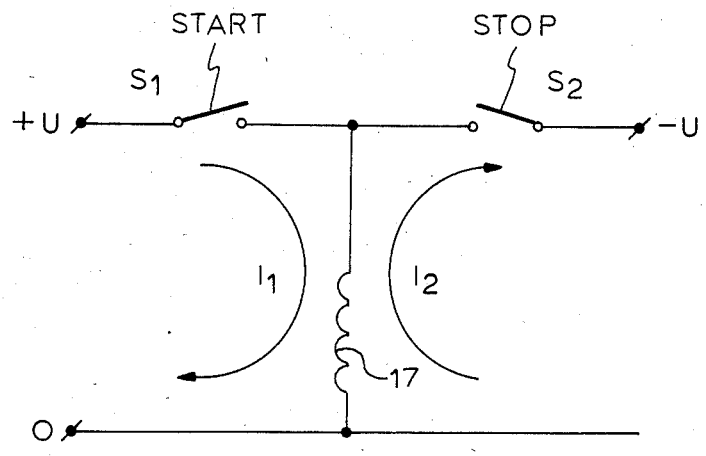
FIG. 6a is a diagram of a first embodiment of circuit for supplying starting and braking electrical pulses to the electromagnet of the spindles.
Figure 6B:
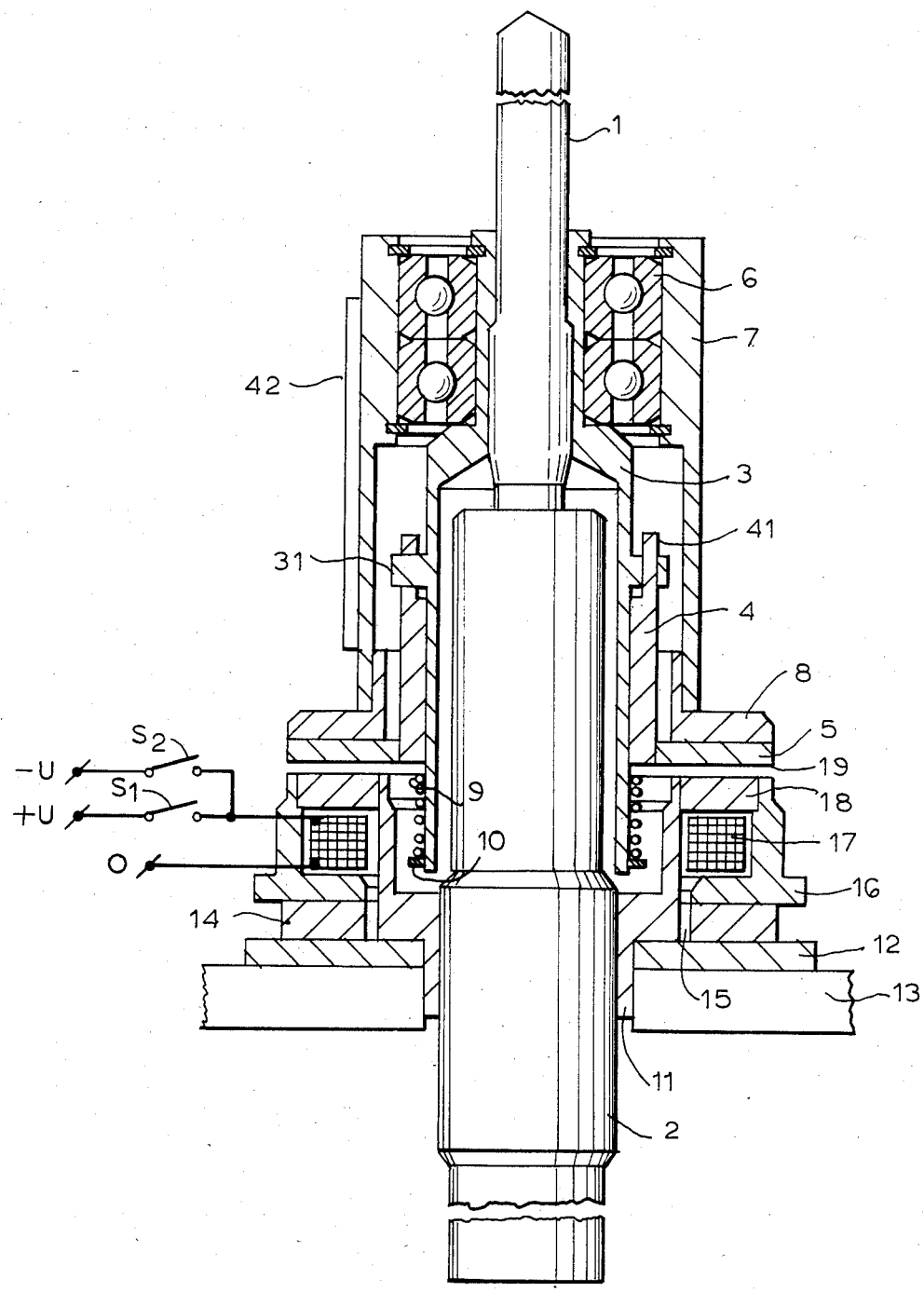
FIG. 6b is a view similar to FIG. 1 but with the addition of a pulse supplying circuit for the electromagnet.

FIGS. 6a and 6b illustrate a first embodiment of circuit whereby the positive electrical pulses 20 and the negative pulses 24 (FIG. 4A) may be generated and applied to the winding 17 of the electromagnetic of the spindle. As shown in these figures, one terminal of winding 17 is connected to ground (O). The positive terminal +U of a direct current source is selectively connected through a pulse-emitting switch $S_1$ to the other terminal of the winding 17; the negative terminal −U of said direct current source is also selectively connected to the other terminal of the coil 17 through a pulse-emitting switch $S_2$. The switch $S_1$, i.e. the "start" switch, and the switch $S_2$, i.e. the "stop" switch may be of the same known construction. Such switches, once pressed to complete their respective circuits, do so for only an adjustable short period of time in order to produce the respective positive electrical pulse 20 and the negative electrical pulse 24.

Figure 7A:
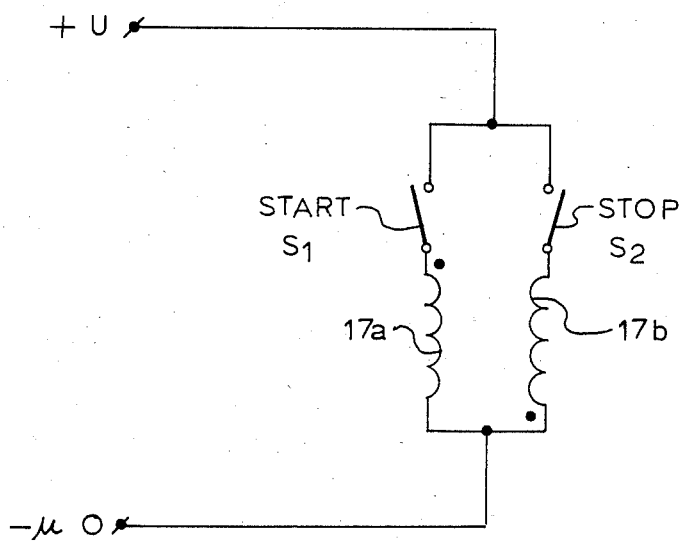
FIG. 7a is a circuit diagram of a second embodiment of circuit for the applying of electrical pulses to the electromagnet of the spindle.
Figure 7B:
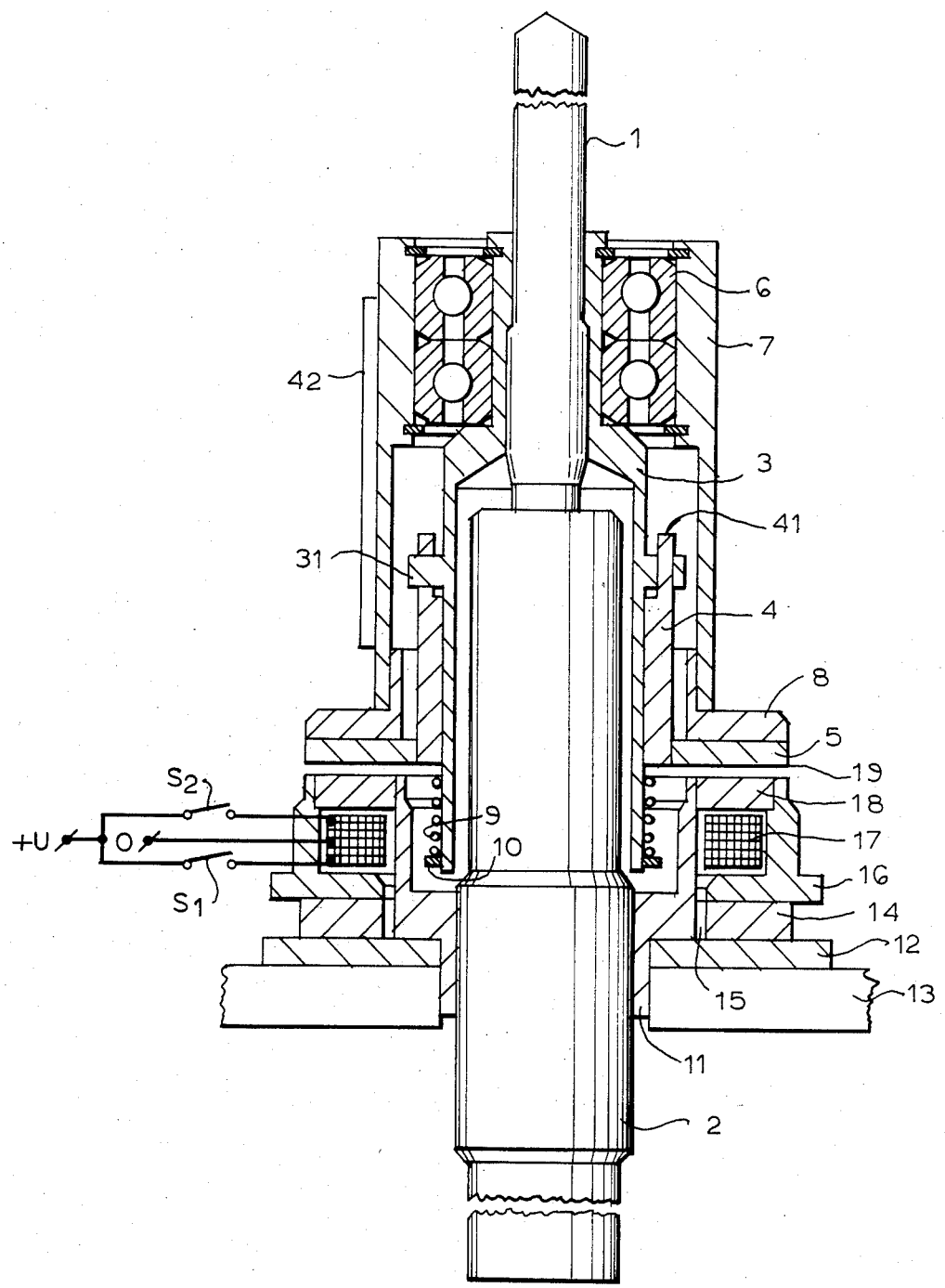

In FIGS. 7a and 7b there is disclosed a second, alternative circuit for producing the positive pulse 20 and the negative pulse 24 which are applied to the winding 17 of the electromagnetic of the spindle. In such alternative circuit, the coil 17 is composed of two oppositely wound equal parts 17a and 17b. One end of each of coil parts 17a and 17b are connected together to the negative terminal −U of a direct current source. The other end of coil parts 17a is connected through a pulse-emitting start switch $S_1$ to the positive terminal, +U of the direct current source, and the other end of coil parts 17b is selectively connected through a pulse-emitting stop switch $S_2$ to the positive terminal +U of the direct current source. In this embodiment, it is the reverse winding of the selectively operative coil parts 17a and 17b which causes the electromagnetic of the spindle to be magnetized in one direction upon the closing of the start switch $S_1$, and the electromagnetic to magnetized in the reverse direction upon the opening of the start switch and closing of the stop switch $S_2$.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. A stop spindle for textile machines, particularly spinning and twisting machines, said spindle having a whirl and a brake lining, comprising a ferromagnetic clutch element which is axially displaceable between the whirl and the brake lining, on the axially opposite side of the brake lining from the whirl there being mounted an electromagnet, the brake lining being made of non-magnetic material, a permanent magnet having radially spaced pole shoes disposed on radially inwardly and outwardly, respectively, sides of the brake lining, means selectively to energize the electromagnet so as to create a magnetic field which is additive with respect to the magnetic field of the permanent magnet, whereby to start the driving of the spindle, and selectively to energize the electromagnet so as to create a magnetic field which is subtractive with respect to the magnetic field of the permanent magnet, whereby to stop the driving of the spindle and to brake it.

2. A stop spindle as claimed in claim 1, wherein the electromagnet is mounted between the pole shoes of the permanent magnet.

3. A stop spindle as claimed in claim 1, wherein said ferromagnetic clutch element comprises a circular disc and defines during operation of the spindle an air gap between said circular disc and the pole shoes of the permanent magnet, and wherein between the pole shoes of the permanent magnet there is interposed a magnetic resistor, of which the flux force is lower than that of the magnetic resistance of the air gap between the ferromagnetic and axially displaceable circular disc and the pole shoes of the permanent manget during the operation of the spindle.

4. A stop spindle as claimed in claim 3, wherein magnetic resistance between the pole shoes of the permanent magnet is constituted by an air gap of which the width between the pole shoes is narrower than the maximum width of the air gap between the ferromagnetic circular disc and the pole shoes, and larger than the minimum distance between the ferromagnetic circular disc and the pole shoes.

* * * * *